(12) United States Patent
Van de Capelle et al.

(10) Patent No.: US 7,593,134 B2
(45) Date of Patent: Sep. 22, 2009

(54) COLOR RENDERING CONTROL SYSTEM

(75) Inventors: Jean-Pierre Van de Capelle, Rochester, NY (US); Howard E. Vogl, Rochester, NY (US); Joseph M. Harrison, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 384 days.

(21) Appl. No.: 11/584,833

(22) Filed: Oct. 23, 2006

(65) Prior Publication Data

US 2008/0144054 A1    Jun. 19, 2008

(51) Int. Cl.
  *G03F 3/08* (2006.01)
  *H04N 1/46* (2006.01)
  *G06K 9/00* (2006.01)
  *B41J 29/393* (2006.01)

(52) U.S. Cl. .................... 358/1.9; 358/504; 358/518; 382/162; 382/167; 347/19

(58) Field of Classification Search ................. 358/1.9, 358/504, 518, 523; 382/162, 167; 347/15, 347/19, 77, 78; 399/15; 700/108
See application file for complete search history.

(56) References Cited

U.S. PATENT DOCUMENTS

| | | | |
|---|---|---|---|
| 5,268,754 A | 12/1993 | Van de Capelle et al. | |
| 5,689,349 A | 11/1997 | Plettinck et al. | |
| 5,760,913 A * | 6/1998 | Falk | 382/167 |
| 5,933,578 A | 8/1999 | Van de Capelle et al. | |
| 6,483,607 B1 | 11/2002 | Van de Capelle et al. | |
| 6,498,610 B1 | 12/2002 | Glaspy, Jr. | |
| 7,054,034 B2 * | 5/2006 | Underwood et al. | 358/1.9 |
| 2002/0118380 A1 | 8/2002 | Krueger et al. | |
| 2002/0124027 A1 | 9/2002 | Krueger et al. | |
| 2002/0193956 A1 | 12/2002 | Van de Capelle et al. | |
| 2003/0002061 A1 | 1/2003 | Van de Capelle | |
| 2004/0064213 A1 * | 4/2004 | Vansteenkiste et al. | 700/108 |
| 2004/0135791 A1 | 7/2004 | Krueger et al. | |
| 2004/0136015 A1 | 7/2004 | Van de Capelle et al. | |
| 2004/0184658 A1 * | 9/2004 | Inoue | 382/162 |
| 2004/0257595 A1 | 12/2004 | Sharma et al. | |
| 2005/0152000 A1 | 7/2005 | Van de Capelle et al. | |
| 2006/0139705 A1 * | 6/2006 | Piatt et al. | 358/504 |

* cited by examiner

*Primary Examiner*—Edward L Coles
*Assistant Examiner*—Charlotte M Baker
(74) *Attorney, Agent, or Firm*—Fay Sharpe LLP

(57) ABSTRACT

A color rendering system and method is disclosed. The color rendering system comprising a color rendering strip generation system configured to generate a group of one or more sets of comparison patches. Each set of comparison patches associated with a particular color and including different color space representations of the color associated with the set.

19 Claims, 6 Drawing Sheets

COLOR RENDERING CONTROL SYSTEM

BACKGROUND

Color printing systems are widely used for a variety of applications. For example, color printing systems are used in office environments, print shops, etc.

Throughout the life cycle of a color printing system, modifications will be made to a printing system. These modifications can occur during the development phase, the installation phase and/or after the color printing system has been released to the customer.

As modifications are made to a printing system it can be difficult to maintain a consistent color rendering from one point in time to the next. Maintaining consistent color rendering is particularly important after a color printing system has been released to a customer and the system color changes need to be minimized.

A particularly challenging situation is when substantial modifications have been performed on a print engine or on its associated DFE (Digital Front End). It is often observed that systems use different sets of profiles or different system settings, relative to the original printing system, to perform required color transformations. This situation is common, especially for systems with multiple controls and rendering intent processes which reflect some way of preferred rendering such as a 'perceptual' rendering intent, 'relative calorimetric' intent, or a 'saturation' rendering intent. Such rendering intents are often controlled by editing the profile or modifying the parameters of a LUT (Look Up Table) generation program until a satisfactory print image is obtained. Additional rendering parameters, such as gray component replacement (GCR), or under color removal (UCR) can also be causes of changed system behavior.

One way of quantifying color differences is by performing measurements on printed patches of specific colors. The measurements will indicate whether or not the color rendering of a color printing system has changed relative to a reference set of measurements. However, performing measurements of printed patches will not conclusively establish what has been modified in the event the color rendering has changed. For example, a change in color rendering could be a result of print engine drift, DFE modifications and/or other system variations. Moreover, the process of measuring the color rendering properties of printed patches utilizing instrumentation can be time consuming and cumbersome.

This disclosure provides a system and method to assess whether the color rendering of a color printing system has been modified. In addition, the disclosure provides a system and method to determine if any color rendering changes are attributable to the DFE, print engine, workflow etc.

BRIEF DESCRIPTION

In accordance with one aspect of this disclosure, a color rendering system is disclosed. The color rendering system comprising a document input system configured to receive one or more input color space representations of an input document in one or more graphic representations; a document output system operatively connected to the document input system, the document output system configured to transmit one or more color space representations of an input document in one or more graphic representations to a document receiving device, wherein the color rendering system processes the input color space representations of the input document according to one or more document processes to produce the one or more output color space representations of an input document; and a color rendering strip system comprising a group of one or more sets of comparison patches, each set associated with a different color, and each comparison patch within a set associated with a different color space representation of the color associated with the set. The different groups represent different types of graphic representations, such as image, outline or text representations, of sets of comparison patches. In yet another aspect of this disclosure one of the groups can have mixed set of graphic representations within one set as well as one or more color spaces within such as a set.

In accordance with another aspect of this disclosure, a color rendering method of determining if the color rendering of a printing control device has been modified is disclosed. The method of determining if the color rendering of a printing control device has been modified comprising printing one or more groups of one or more sets of comparison patches, each set of comparison patches representing a different color and each comparison patch within a set representing a different color space and or a different graphic representation of the color associated with the set; determining if the comparison patches within the one or more sets substantially match in color; and determining the printing control device has not been modified if the comparison patches within the one or more sets substantially match in color, or determining the printing control device has been modified if the comparison patches within the one or more sets do not substantially match in color. In one aspect of the disclosure, the sets within one group are all of the same type of graphic representation, such as images, outline or text, and different groups represent different graphic representations. In yet another aspect there are mixed graphic representations within one group, and within one set the patches are represented using one or more color spaces.

In accordance with another aspect of this disclosure, a color rendering system is disclosed. The color rendering system comprising a color rendering control strip generation system configured to generate one or more groups of one or more sets of comparison patches, each set associated with a different color, and each comparison patch within a set associated with a different color space representation of the color associated with the set, wherein a group of one or more sets of comparison patches are generated from a reference strip data file. Different groups of patches can be generated to represent different graphic representations, such as image, outline or text, of the sets of color patches or alternatively one group can contain different graphic representations of the sets of color patches, and use one or more color spaces.

In accordance with another aspect of this disclosure, a color rendering apparatus is disclosed. The color rendering apparatus comprising a set of one or more control patterns associated with a set of one or more reference processing parameters, wherein the rendering apparatus is configured to process said control patterns with processing parameters and output said processed control patterns for additional processing and/or printing and comparison for determining if the color rendering apparatus is performing within the specifications associated with said reference processing parameters.

DETAILED DESCRIPTION

For purposes of this disclosure, the following expressions and terms are defined as follows:

Printing process refers to any means, procedure or device to produce hard copy output.

Rendering process, document process, and data process refers to the method or process to render a document representation, for example, the document representation may take the form of an electronic file format that can more readily be printed or displayed using a printing process or display device. Alternatively, these expressions may also refer to the physical process of printing or displaying the electronic file.

Color conversion processes and color transformation processes refer to processes and procedures that convert one color space representation to another color space representation.

System settings, rendering parameters, rendering intent, rendering intent process, controls, processing options, processing parameters and process controls refer to all the possible parameters of a workflow system and or printing system that will affect the final printed or displayed output starting from the electronic file format. In some instances the term "workflow" may also be used to indicate the aggregate of system settings. A workflow system is a system that enables the specification of these settings and execution of the necessary operations on the electronic file to facilitate the rendering. Also a DFE (Digital Front End) has controls similar to a workflow system. In some instances the workflow system may be considered to include the DFE, and in other instances the workflow system may not include a specific DFE. In yet other instances these terms may pertain to the DFE or the DFE and printing press. The DFE typically has the capability to execute many of the rendering processes, and it will typically also drive the printing press. In some instances the workflow systems can also drive the printing device.

Color conversion settings, color conversion parameters are the system settings that affect the conversion from one or multiple color spaces into one or more multiple color spaces.

Color space representations are color spaces used to define the color of different graphic objects.

Graphic representations usually refer to a specific type of object, such as an image-like format (with different resolutions, bit depth and possibly different color space definition), vector-like format including smooth shades, text like format, etc.

As briefly discussed in the background section, disclosed is a system and method to assess whether the color rendering of a printing system has been modified. To determine color rendering differences, the system and method prints a set of visual comparison patches which substantially match up when no changes to the color rendering of a printing system have occurred. When changes have occurred to the printing system, which impact the color rendering of the printing system, the comparison patches will not substantially match for the effected color.

Figure 1:
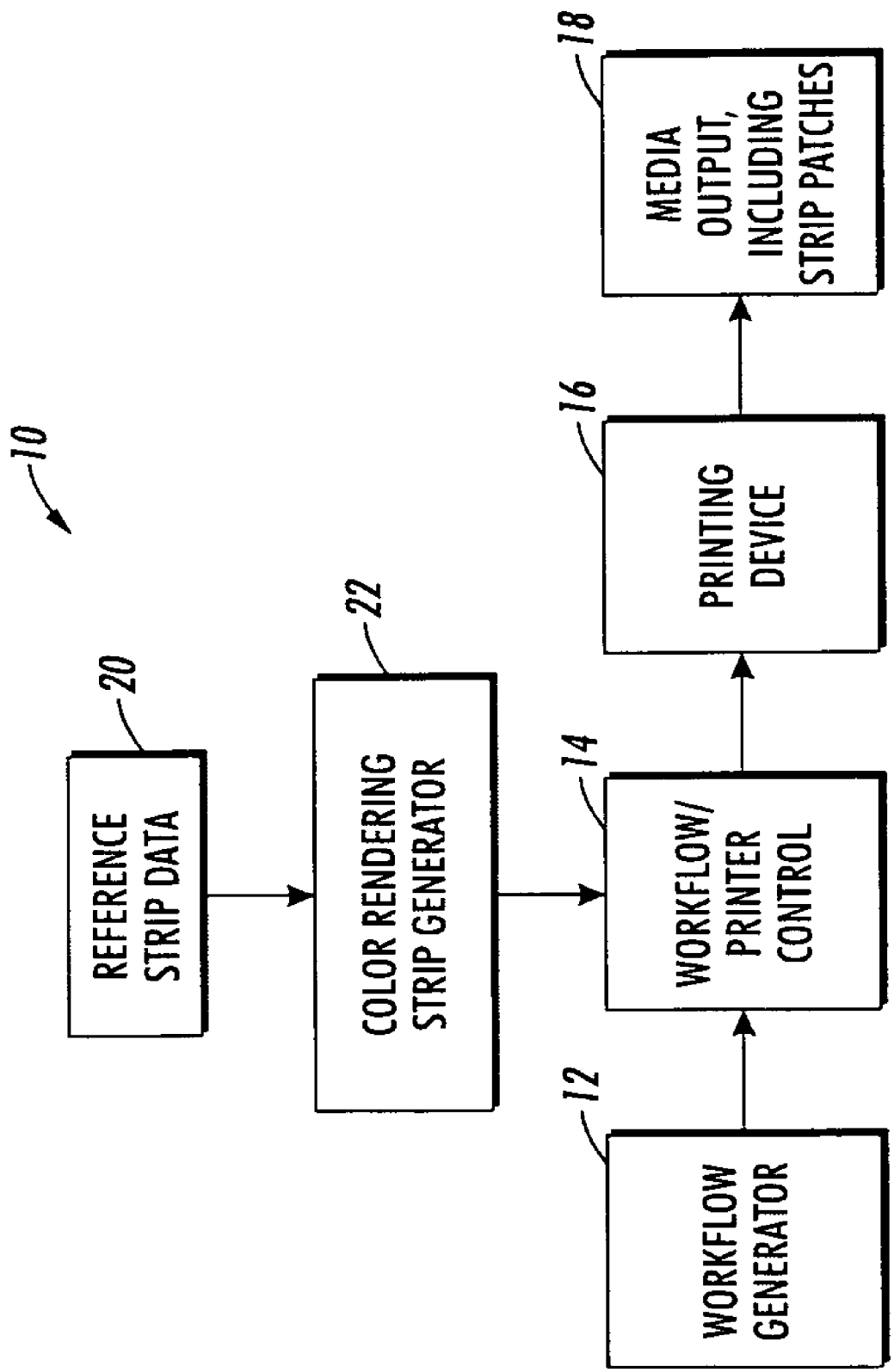
FIG. 1 is a schematic representation of a color rendering system according to an exemplary embodiment of this disclosure.

With reference to FIG. 1, illustrated is a color rendering system according to an exemplary embodiment of this disclosure. The color rendering system 10 comprises a workflow generator module 12, a workflow/printer control module 14, a printing device 16, a media output module 18 including strip patches, a reference strip data module 20, and a color rendering strip generator module 22.

The workflow generator module 12 provides printer workflow originally generated from one or more sources such as a computer program, a scanner, a manual interface etc. The workflow generator 12 outputs a data file representative of a document to be printed, the data file formatted as a native application file, or as a PDL (Page Description Language) file, a PDF (Portable Document Format) or other document layout language. Throughout this disclosure, the output of the workflow generator 12 may be referenced as a PDL file, however this disclosure is not limited to a PDL format workflow. As previously discussed, the disclosure is applicable to workflow generator 12 outputs associated with other document layout languages. The PDL output or other document layout language output from the workflow generator module 12 is further processed by the workflow/printer control module 14.

The workflow/printer control module 14 is representative of a DFE (Digital Front End) type device or a workflow module upstream of a DFE. A typical workflow module would process the input PDL files associated with a certain job and produce modified PDL files that are more suitable to be printed. A primary function of the DFE/printer control module is the generation of one or more pixel files from the inputted PDL or other document layout programming language. In some cases a workflow module and DFE module are combined into one platform, in other cases these two modules reside on different platforms. In one aspect of this disclosure the workflow module produces one or more print ready pixel files, in another aspect of this disclosure the workflow module produces one or more modified PDL files. For the purpose of this disclosure the files produced by the workflow/printer control module 14 shall be referred to as workflow output files. It shall be clear to anyone of ordinary skill in the art that these output files could be of different formats and types. The one or more workflow output files are further processed by the printing device 16 which produces a document of the appropriate media 18. Such media could be a printed media or a display media. In addition to producing one or more workflow output data files from the output of the workflow generator module 12, the workflow/printer control module 14 processes the inputted PDL data files using one or more color space transformations to produce the workflow output files for printing or displaying. In general, the color space transformations are utilized to better control the printed output of the printing/displaying device 16 by selectively processing groups of data within a document according to specific attributes associated with the groups. For example, RGB→CMYK, CIE XYZ/Lab→CMYK, SPOT→CMYK, and CMYK→CMYK are color transformations commonly used by a DFE for processing a PDL file for printing. CMYK->RGB, Spot->RGB, CIE/XYZ/Lab->RGB are typically used by a display device. Finally, the workflow/printer control module 14 produces one or more workflow output files which are compatible with the appropriate printing or display device 16 and processes the files according to a particular set of color conversion settings. The color conversion process accounts for customer preferences related to color and color definition differences between the original document file and the output produced by the printing device or display 16.

To determine if any modifications have been made to the workflow/printer control module 14, a color rendering strip generator module 22 is provided. The color rendering strip generator module 22 processes reference strip data 20 and provides a color rendering strip data file to the workflow/printer control module 14, which subsequently processes the color rendering strip data file and outputs the coloring rendering strip data file to the printing or displaying device 16 which prints or displays the color rendering strip patches with or without a printed document 18.

Figure 2:
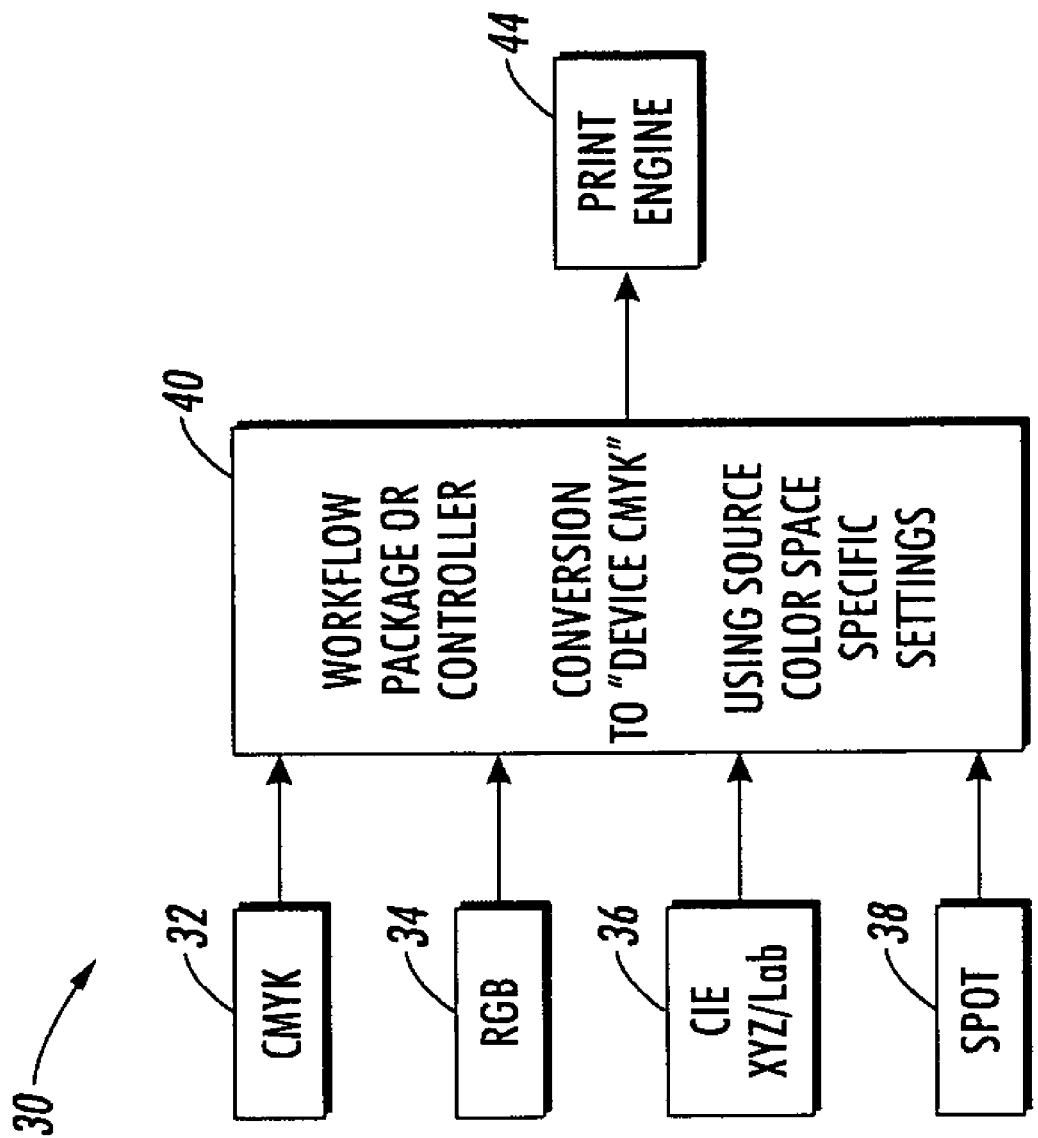
FIG. 2 is another schematic representation of a color rendering system according to an exemplary embodiment of this disclosure.

With reference to FIG. 2, illustrated is a schematical representation of the color conversion processes 30 according to an exemplary embodiment of this disclosure. The color conversion process comprising a CMYK color space representation of a document 32, a RGB color space representation of a document 34, a CIE XYZ/Lab color space representation of a document 36, a SPOT color space representation of a document 38, a workflow package or controller 40, and a print engine 44. In another embodiment of this disclosure the module 44 represents an electronic display, in yet another embodiment of this disclosure it represents a projector.

Each color space representation of the document to be displayed or printed is independently processed by the workflow package or controller 40 according to data processes associated with each color space representation. The color space processing by the workflow package or controller 40 may be customized for specific customer requirements. Subsequent to processing the one or more color space representations of the document to be printed, the workflow package or controller 40 converts the processed color space data representations to the printing device specific CMYK color space for printing 44. In an alternative embodiment of this disclosure, the workflow package 40 converts the processed color space data representations to the display specific RGB color space.

Figure 3:
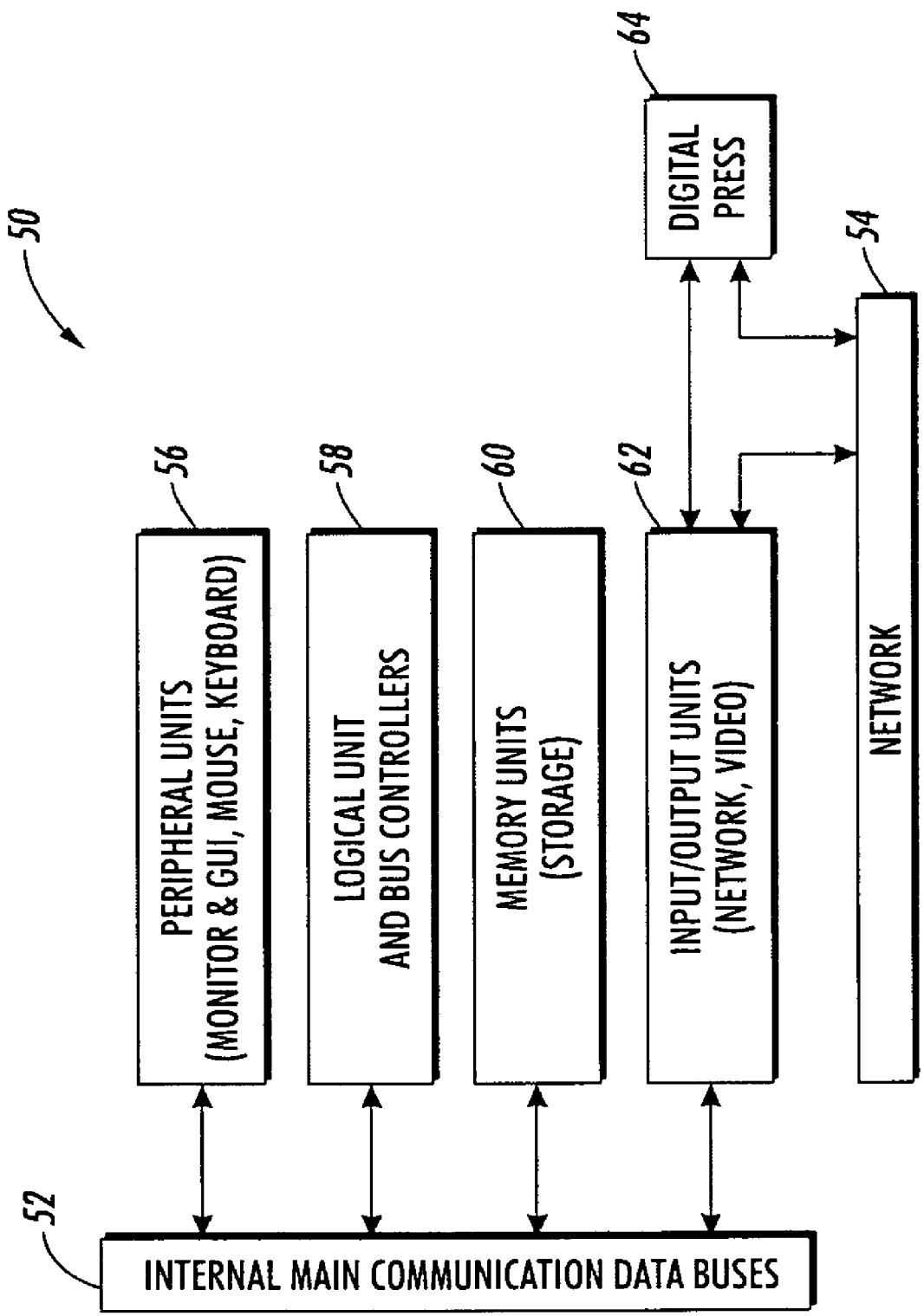
FIG. 3 is another schematic representation of a color rendering system according to an exemplary embodiment of this disclosure.

With reference to FIG. 3, illustrated is a simplified RIP (Raster Image Processor)/workflow hardware components 50 block diagram according to an exemplary embodiment of this disclosure. As illustrated, the system may include internal main communication data buses 52, peripheral units 56, a logical unit and bus controller 58, memory units 60, input/output units, a network 54, and a digital press 64.

Figure 4:
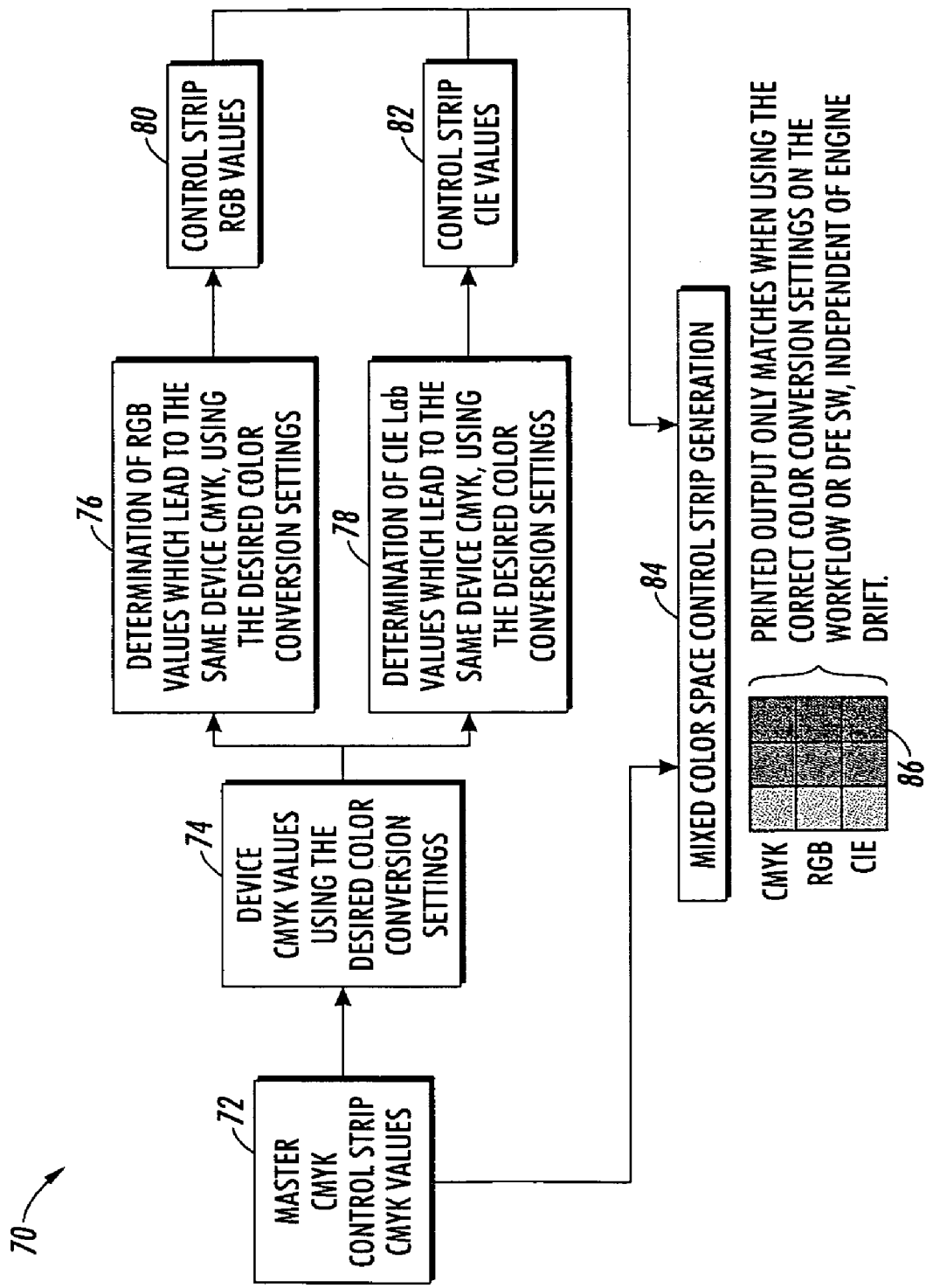
FIG. 4 is a block diagram representation of a color rendering system according to an exemplary embodiment of this disclosure.

With reference to FIG. 4, illustrated is a block diagram of a color rendering strip generation system and method 70 according to an exemplary embodiment of this disclosure.

To generate a color rendering strip 86 for a printing system, an initial master control strip data set 72 is acquired by the color rendering strip generation system 70. The master control strip data set can be in any color space, for example CMYK, RGB, CIE. XYZ or any other color space. For descriptive purposes in this disclosure the master control strip data will be referred to as master CMYK control strip data. It should be clear to those of ordinary skill in the art that the master control strip data can be expressed in any color space. The master CMYK control strip data set includes CMYK values which represent a baseline or reference set of different colors determined by the user or the system vendor as important. The master CMYK control strip data set is subsequently processed to produce other equivalent color space representations of the selected colors. The matching of a set of printed color patches is achieved if the correct color conversion settings associated with all color transformation processes is properly configured.

With continued reference to FIG. 4, the detailed operation of the color rendering strip generation system and method 70 will now be described. The operation of the color rendering strip generation is described with reference to a printed patch 86 including CMYK, RGB and CIE color space printed patches. Moreover, the system and method of generating the color space printed patches is described with reference to these color spaces. However, this disclosure and the exemplary embodiments described herein are not limited to the generation of any type of CMYK, RGB and CIE color space patches. For example, the color space printed patches may include gray, CMYKRGB, CMYKOG, any combination of spot colors, etc.

Initially, the acquired master CMYK values are converted to printing device specific CMYK values 72 using the desired color conversion settings 74. Subsequently, a determination of the RGB 76 and CIE Lab 78 values which produce the same device CMYK values, using the desired color conversion settings, is performed. The resulting RGB and CIE Lab values are classified as control strip RGB 80 and CIE Lab 82 values respectively. The control strip RGB values 80, control strip CIE Lab values 82 and master CMYK control strip CMYK values 72 are subsequently processed 84 to produce mixed source color space control strip 86. The mixed color space control strip generation module 84 takes the master CMYK values, the matching RGB values and the matching CIE values, and produces a graphic representation 86 of a control strip which can be included with jobs to be processed by a certain workflow according to FIG. 1 and FIG. 2. The graphic representation can be images, or vector, or text like, or all three. As this mixed source color space control strip is processed alongside a regular job, using the desired processing options, the mixed color space control strip is converted to device color space values, usually device CMYK, in general it can be any type of device color space, including special inks, such as Pantone ® inks or RGB for displaying purposes. This printed or displayed output of the control patches will substantially match when the job processing parameters are equal to the processing parameters used to generate the control strip.

The color rendering strip 86 for instance represents three different shades (columns) of a certain tint, or alternatively of different tints. Each shade is represented in three different color spaces as a master CMYK control strip patch output, a RGB color space control strip patch output, and a CIE color space control strip patch output.

Figure 5:
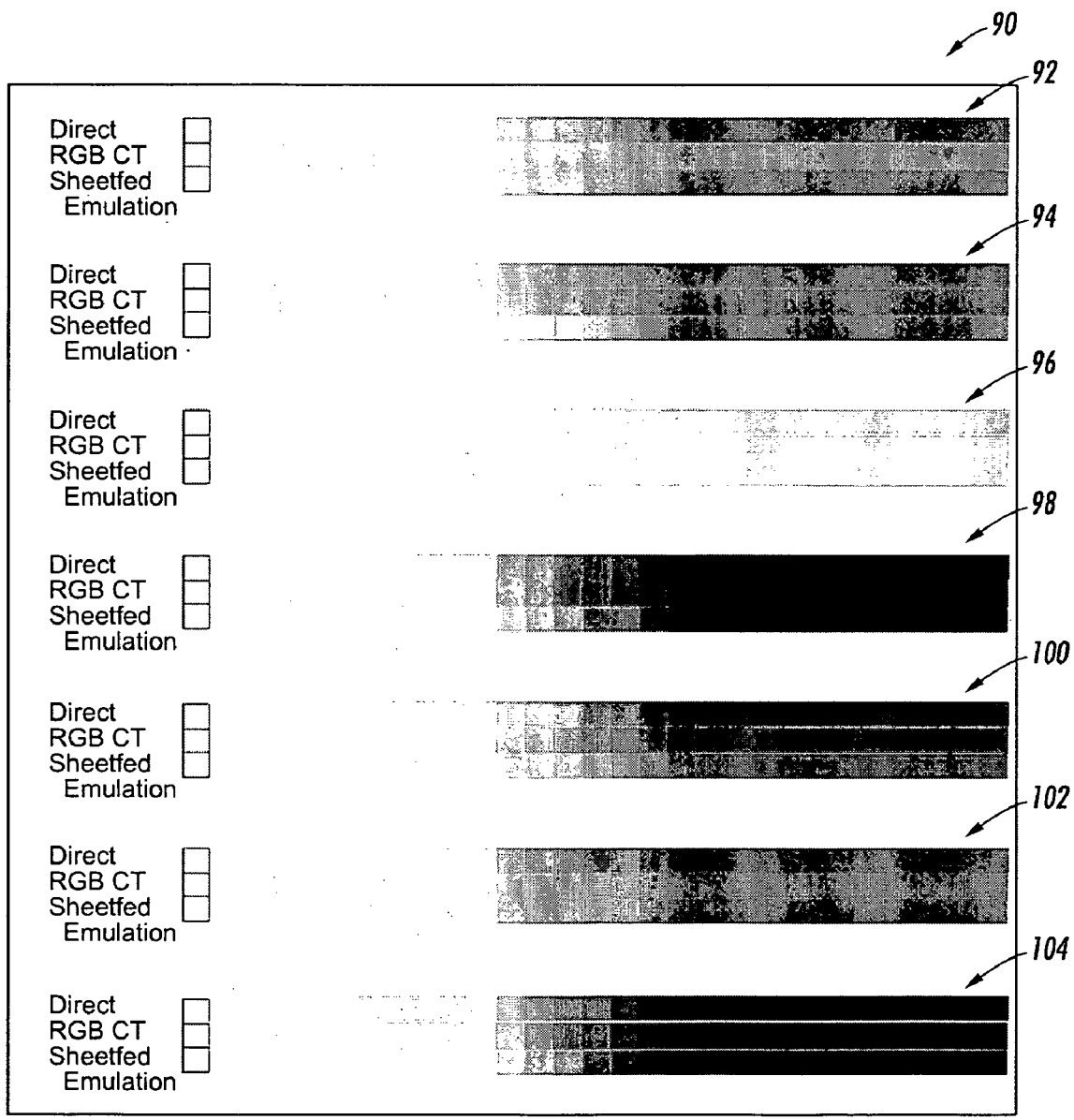
FIG. 5 is an illustration of printed patches according to an embodiment of this disclosure.

With reference to FIG. 5, illustrated is a group of color rendering strip comparison patches 90 including a first reference color strip 92, a second reference color strip 94, a third reference color strip 96, a fourth reference strip 98, a fifth reference color strip 100, a sixth reference color strip 102 and a seventh reference color strip 104. Each reference color strip represents a different color with a range of shades progressing from the left to the right of the reference color strip. Within each reference color strip are three rows of comparison color patches. The top and bottom row of patches for each color comprises a set of CMYK patches and the middle row of patches for each color are RGB patches. This control strip can for instance be designed such that if the RGB color space is rendered with a specific RGB color space and the perceptual intent process, and the CMYK is processed with a "direct" setting than the top two rows of every strip will match. The control strip can for example be further designed such that if the RGB color space is rendered with a specific RGB color space and the perceptual intent process, and the CMYK is rendered with "sheetfed offset emulation, relative intent" process than the bottom two rows of every strip will match. Any modification to the workflow package, workflow controller or DFE which involves a modification to the specific workflow will destroy the comparison patch matching. Such modification could for instance be a different user selection for the source color space of RGB or CMYK or the installation of a different destination profile, which will convert the source color space to the device color space in a different way. Moreover, the matching is not prone to print engine drift because the rendered CMYK values for the comparison patches is identical; therefore printing engine drift does not have an effect on the matching of the comparison patches.

The color rendering control strip is specific to all the relevant processing options, such as the choice of input profile, output profile, rendering intent, screening option, paper choice, UCR/GCR etc. The color rendering control strip may also be specific to the different graphic object types (text, outline, image), because the color rendering of such different graphic object types may be different. In the most general case these processing options are combinatorial and a color rendering control strip depends on the exact combination of processing options. As such the generation module of the color rendering color strip needs to be provided with these settings, as illustrated in FIG. 4. When the combination of these different processing options is determined for a certain workflow, the color rendering control strip for this set of processing options can be generated and attached to the workflow. If an operator changes the workflow then the color rendering control strip would signal this change because of substantially breaking matches between corresponding color patches. A customer can use the same concept in order to validate that the system provider has not changed the color rendering of the system from one release to the next. It is very typical in this field for the system provider to issue different software releases at certain time intervals over the life cycle of a product, or that certain sub-systems within the system are being revised over the life cycle of the product. The concepts of this disclosure can also be used for validating color workflow consistency across different system releases.

Figure 6:
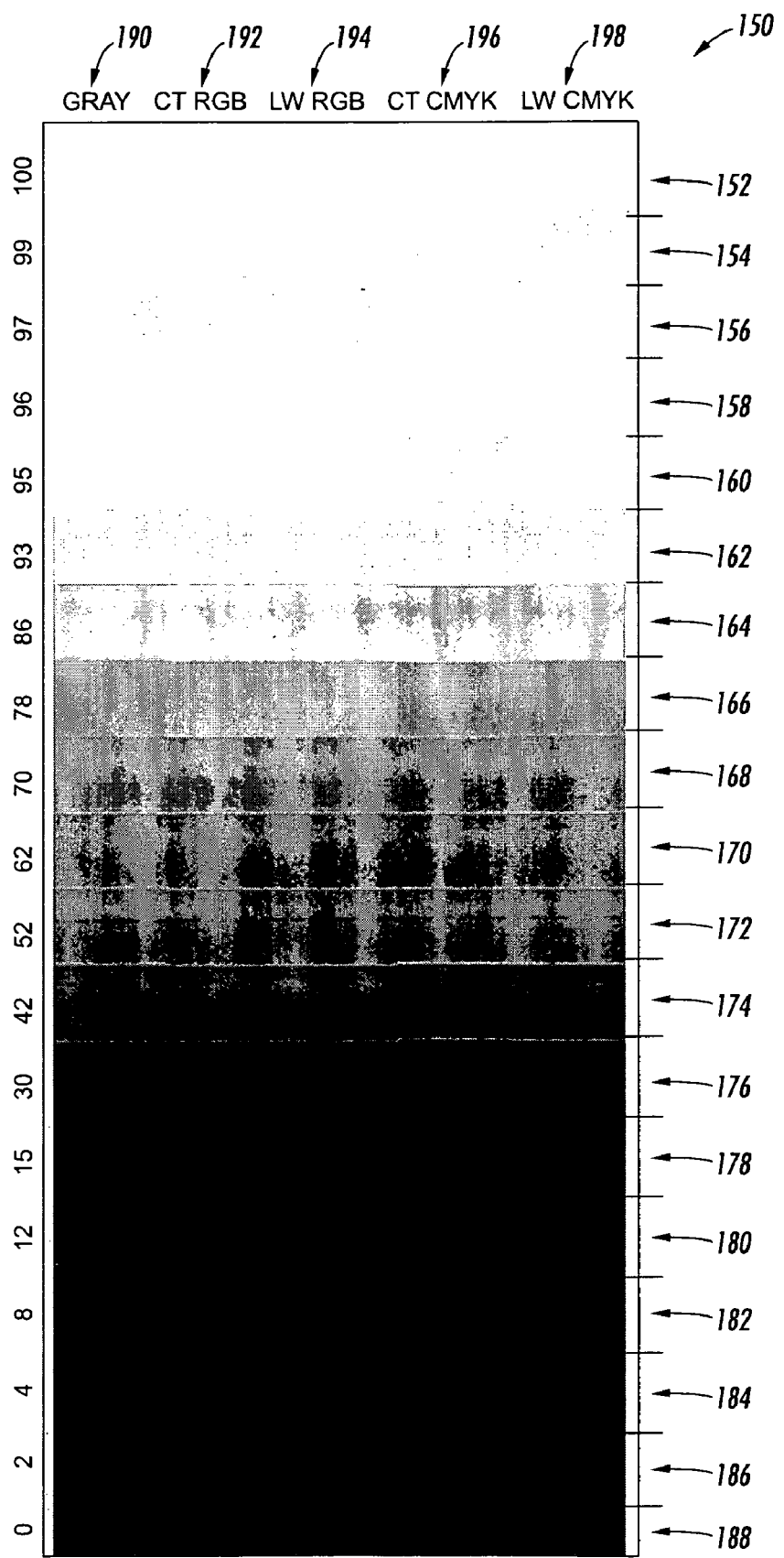
FIG. 6 is another illustration of printed patches according to an embodiment of this disclosure.

With reference to FIG. 6, illustrated is a set of color rendering strip comparison patches according to one exemplary embodiment of this disclosure. The color rendering strip comprises five neutral gray columns containing discrete tonal steps. The columns are CT (image) gray 190, CT RGB 192, LW (Line work or vector) RGB 194, CT CMYK 196 and LW CMYK 198. The rows of patches represent a first gray scale patch 152, a second gray scale patch 154, a third gray scale patch 156, a fourth gray scale patch 158, a fifth gray scale patch 160, a sixth gray scale patch 162, a seventh gray scale patch 164, an eighth gray scale patch 166, a ninth gray scale patch 168, a tenth gray scale patch 170, an eleventh gray scale patch 172, a twelfth gray scale patch 174, a thirteenth gray scale patch 176, a fourteenth gray scale patch 178, a fifteenth gray scale patch 180, a sixteenth gray scale patch 182, a seventeenth gray scale patch 184, an eighteenth gray scale patch 186 and a nineteenth gray scale patch 188. In addition, embedded in each discrete tonal step is a CT black-only square that has the equivalent L* value of that tonal step for a specific set of processing parameters for CIE, RGB, CMYK CT and LW objects in the workflow package. The black-only squares are affected by the workflow package, workflow controller or DFE processing in a manner different from that of the RGB and CMYK patches. When the RGB and CMYK processing within a workflow package, workflow controller or DFE is configured to provide substantially equivalent comparison output patches, the black-only squares will visually almost disappear into the RGB and CMYK tonal steps.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. a color rendering control system comprising:
   a document input system configured to receive one or more input color space representations of an input document in one or more graphic representations;
   a document output system operatively connected to the document input system, the document output system configured to transmit one or more color space representations of the input document in one or more graphic representations to a document receiving device, wherein the color rendering system processes the input color space representations of the input document according to one or more document processes to produce the one or more output color space representations of the input document in one or more graphic representations; and
   a color rendering strip system configured to generate a group of one or more sets of comparison patches for rendering, each set associated with a different color, and each comparison patch within a set associated with a different rendering processes used to render the set color, wherein a substantial match of the comparison patches within a set indicates the rendering processes associated with the set are properly configured for the respective set color.

2. The color rendering system according to claim 1, wherein each set of comparison patches comprises two or more representations from a group of representations consisting of an outline representation, a text representation, and an image representation of a color.

3. The color rendering system according to claim 1, further comprising:
   a reference strip data set, wherein the color rendering strip generation system is configured to generate strip data associated with the reference strip data set.

4. The color rendering system according to claim 3, wherein the reference strip data set is generated by a method comprising:
   producing a master strip data set associated with one or more predetermined colors, the data set providing a first representation of the one or more predetermined colors;
   producing an output device specific color conversion data set associated with the master strip data set, the output device specific color conversion data set representing the master strip data set converted to a second representation of the one or more predetermined colors; and
   determining a third representation of the one or more predetermined colors, the third representation producing an approximately equivalent representation in the second color space, using the document processes, of the one or more predetermined colors.

5. The color rendering system according to claim 1, the color rendering strip generation system producing the group of one or more sets of comparison patches based on a reference strip data set.

6. The color rendering system according to claim 1, wherein the group of one or more sets of comparison patches substantially match for a predetermined reference configuration associated with the color rendering system.

7. The color rendering system according to claim 6, wherein a substantial mismatch of two or more patches within one or more sets of comparison patches, indicates the configuration of the color rendering system is not approximately equivalent to the reference configuration associated with the color rendering system.

8. The color rendering system according to claim 1, wherein each set of comparison patches comprises two or more representations from a group of representations consisting of a CMYK color space representation, a RGB color space representation, a CIE color space representation, and a spot color space representation of a color.

9. A color rendering system comprising:
   a color rendering control strip generation system configured to generate a group of one or more sets of comparison patches for rendering, each set associated with a different color, and each comparison patch within a set associated with a different rendering process used to render the set color, wherein a substantial match of the comparison patches within a set indicates the rendering processes associated with the set are properly configured for the respective set color and the group of one or more sets of comparison patches are generated from a reference strip data set.

10. The color rendering system according to claim 9, wherein the reference strip data set is associated with a printing system color conversion configuration for producing approximately equivalent comparison patches within each set of comparison patches.

11. The color rendering system according to claim 10, wherein a mismatch of two or more comparison patches within one or more sets of comparison patches indicates one or more modifications to a printing system.

12. The color rendering system according to claim 11, wherein the reference strip data is associated with predetermined color conversion data for generating two or more substantially consistent representations of a predetermined color.

13. The color rendering system according to claim 12, the two or more representations comprising:
   one or more outline graphical representations.

14. The color rendering system according to claim 12, the two or more representations comprising:
   one or more image graphical representations.

15. The color rendering system according to claim 12, the two or more representations comprising:
   one or more CMYK color representations.

16. The color rendering system according to claim 12, the two or more representations comprising:
   one or more RGB color space representations.

17. The color rendering system according to claim 12, the two or more representations comprising:
   one or more CIE color space representations.

18. The color rendering system according to claim 12, the two or more representations comprising:
   one or more spot color space representations.

19. The color rendering system according to claim 12, the two or more representations comprising:
   one or more textual graphic representations.

* * * * *